United States Patent
Halmos et al.

(10) Patent No.: US 11,588,551 B2
(45) Date of Patent: Feb. 21, 2023

(54) FIBER-BUNDLED FREQUENCY-SHIFTED TRANSMITTER FOR DIRECT DETECTION LIDAR

(71) Applicant: Raytheon Company, Waltham, MA (US)

(72) Inventors: Maurice J. Halmos, Encino, CA (US); Fabio Di Teodoro, Hacienda Heights, CA (US)

(73) Assignee: Raytheon Company, Waltham, MA (US)

( * ) Notice: Subject to any disclaimer, the term of this patent is extended or adjusted under 35 U.S.C. 154(b) by 120 days.

(21) Appl. No.: 17/105,368

(22) Filed: Nov. 25, 2020

(65) Prior Publication Data

US 2022/0166512 A1   May 26, 2022

(51) Int. Cl.
| | | |
|---|---|---|
| *H04B 10/25* | (2013.01) | |
| *G01S 17/26* | (2020.01) | |
| *G01S 7/481* | (2006.01) | |
| *H04B 10/556* | (2013.01) | |

(52) U.S. Cl.
CPC ............ *H04B 10/25* (2013.01); *G01S 7/4818* (2013.01); *G01S 17/26* (2020.01); *H04B 10/5563* (2013.01)

(58) Field of Classification Search
None
See application file for complete search history.

(56) References Cited

U.S. PATENT DOCUMENTS

| | | | |
|---|---|---|---|
| 5,847,816 A * | 12/1998 | Zediker | ................. G01S 7/4917 356/28.5 |
| 6,181,412 B1 | 1/2001 | Popescu et al. | |
| 7,079,815 B2 | 7/2006 | Pozgay et al. | |
| 8,390,395 B2 | 3/2013 | Carroll et al. | |
| 8,939,081 B1 | 1/2015 | Smith et al. | |
| 9,207,408 B1 | 12/2015 | Di Teodoro et al. | |
| 9,287,870 B2 | 3/2016 | Richardson et al. | |
| 9,354,317 B2 | 5/2016 | Halmos | |
| 10,186,828 B2 | 1/2019 | Di Teodoro | |
| 10,261,187 B2 | 4/2019 | Halmos | |
| 2009/0010600 A1 * | 1/2009 | Kim | ..................... G02B 6/4246 385/90 |
| 2011/0037970 A1 | 2/2011 | Rogers et al. | |
| 2011/0106324 A1 | 5/2011 | Tsadka et al. | |
| 2013/0166113 A1 * | 6/2013 | Dakin | ................... G01P 13/025 356/28 |
| 2019/0072651 A1 | 3/2019 | Halmos et al. | |
| 2019/0094345 A1 * | 3/2019 | Singer | ..................... G01S 17/42 |

OTHER PUBLICATIONS

International Search Report and Written Opinion of the International Searching Authority in connection with International Patent Application No. PCT/US2021/058242 dated Feb. 24, 2022, 17 pages.

(Continued)

*Primary Examiner* — Darren E Wolf (57) ABSTRACT

A method includes generating, using a transmitter, an optical signal for each fiber incoherently combined in a fiber bundle. The method also includes transmitting the optical signal from each fiber as pulses at a target. The method further includes receiving, using a receiver array, the pulses of the optical signals and identifying one or more parameters of the target based on the pulses of the optical signals.

21 Claims, 7 Drawing Sheets

OTHER PUBLICATIONS

Liu et al., "Multiple-input multiple-output 3D imaging laser radar," AOPC 2015: Optical and Optoelectronic Sensing and maging Technology, Proceedings of SPIE, vol. 9674, 2015, 6 pages.
Dolfi-Bouteyre et al., "Pulsed 1.5-µm LIDAR for Axial Aircraft Wake Vortex Detection Based on High-Brightness Large-Dore Fiber Amplifier," IEEE Journal of Selected Topics in Quantum Electronics, vol. 15, No. 2, Mar. 2009, 11 pages.

* cited by examiner

FIG. 6

FIBER-BUNDLED FREQUENCY-SHIFTED TRANSMITTER FOR DIRECT DETECTION LIDAR

TECHNICAL FIELD

This disclosure generally relates to laser radar systems. More specifically, this disclosure relates to a fiber-bundled frequency-shifted transmitter for direct detection LIDAR.

BACKGROUND

A laser detection system can be used to illuminate one or more objects using pulsed laser light, where reflected pulses from the objects are received and analyzed in order to identify information about the objects. For example, a laser detection system may be used to illuminate a moving object in order to determine a range to the object. In this way, the system can be used to identify the distance to the object and the speed of the object.

SUMMARY

This disclosure provides a fiber-bundled frequency-shifted transmitter for direct-detection LIDAR.

In a first embodiment, a method includes generating, using a transmitter, an optical signal for each fiber incoherently combined in a fiber bundle. The method also includes transmitting the optical signal from each fiber as pulses at a target. The method further includes receiving, using a receiver array, the pulses of the optical signals and identifying one or more parameters of the target based on the pulses of the optical signals.

In a second embodiment, a system includes a transmitter configured to generate an optical signal for each fiber incoherently combined in a fiber bundle and transmit the optical signal from each fiber as pulses at a target. The system also includes a receiver array configured to receive the pulses of the optical signals. The system further includes a signal processor configured to identify one or more parameters of the target based on the pulses of the optical signals.

In a third embodiment, an apparatus includes a transmitter configured to generate an optical signal for each fiber incoherently combined in a fiber bundle and transmit the optical signal from each fiber as pulses at a target. The apparatus also includes a receiver array configured to receive the pulses of the optical signals. The apparatus further includes a signal processor configured to identify one or more parameters of the target based on the pulses of the optical signals. The apparatus also includes a housing for containing the transmitter, the receiver array and the signal processor.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1A through 6, described below, and the various embodiments used to describe the principles of the present disclosure are by way of illustration only and should not be construed in any way to limit the scope. Those skilled in the art will understand that the principles of the present disclosure may be implemented in any type of suitably arranged device or system.

Many long-range direct detection LIDAR systems require an agile laser transmitter emitting high-energy pulses of adjustable repetition rate, duration, and temporal profile. In many applications of interest, a LIDAR system of low size, weight, and power (SWaP) and capable of operating in the eye-safe region of the electromagnetic spectrum at wavelengths greater than 1.5 µm. Pulsed fiber lasers (PFLs) can advantageously be used in such LIDAR systems owing to their high degree of pulse-format agility (including architectures in which the pulse rep. rate, width, and shape can dynamically be modified on a pulse to pulse basis), compact form factor, inherent ruggedness, high reliability, and direct emission at eye-safe wavelengths. However, PFLs are subject to nonlinear optical effects, which limit the achievable pulse energy and peak power to lower values compared, for example, to bulk solid-state lasers. This disclosure teaches an approach to circumventing this limitation through the incoherent combination of an array of PFLs terminated by a fiber bundle, such that the beamlets exiting each element of the array form a single beam in the far field carrying the cumulative power of all arrayed PFLs. In some embodiment, the disclosure also teaches methods to smoothen the spatial speckle pattern of the array-emitted beam at the target location by mutually frequency-offsetting the arrayed PFLs. In particular, if the optical frequencies of the arrayed PFLs differ by an amount greater than the pulse repetition rate, each pulse is associated with a different realization of speckle pattern such that averaging LIDAR returns over several (for example, 100 s or more) pulses results in the detection of a smoothly illuminated spot at the target.

Figure 1A:
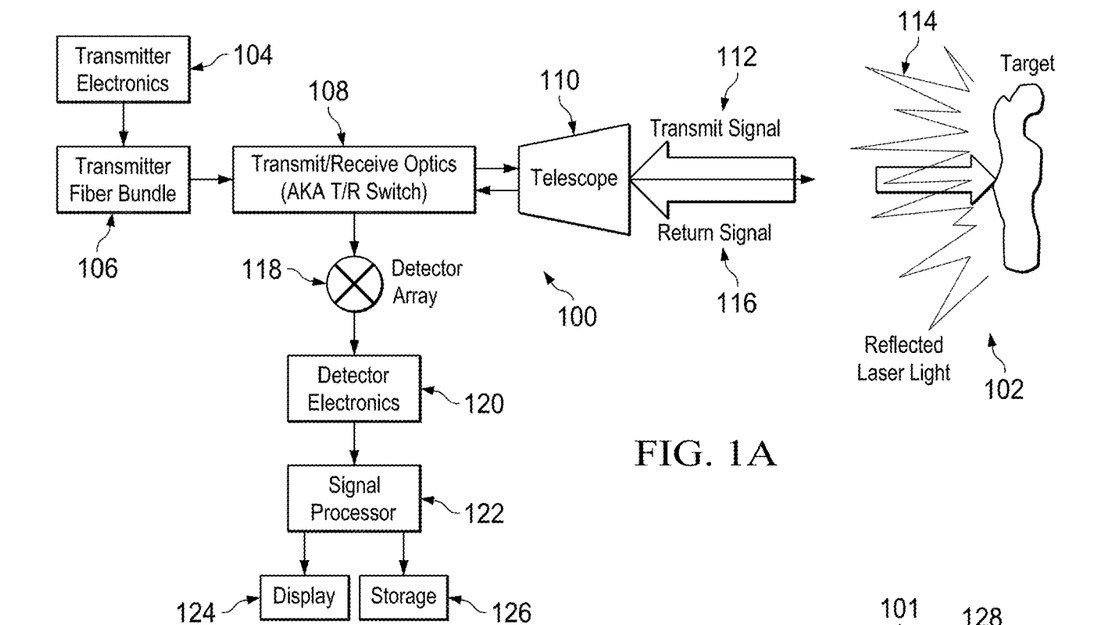
FIGS. 1A and 1B illustrate an example laser system and laser apparatus according to this disclosure.
Figure 1B:
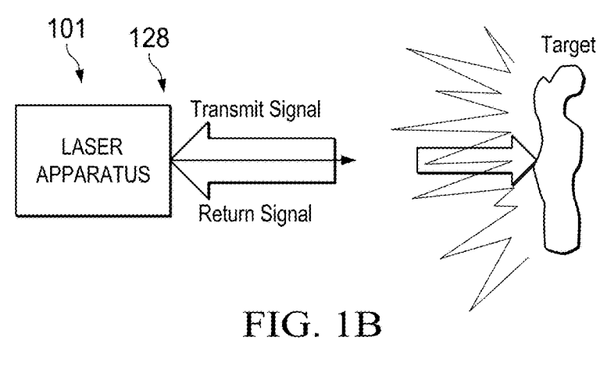

FIGS. 1A and 1B illustrates an example laser system 100 and laser apparatus 101 according to this disclosure. As shown in FIG. 1A, the system 100 is used to detect one or more targets 102 and one or more parameters associated with each of the targets 102. In this example, the target 102 is a randomly-shaped object, although this is for illustration only. Any suitable target or targets 102 may be detected by the system 100. Example targets 102 that may be detected by the system 100 can include drones or other aerial vehicles, trucks or other ground-based vehicles, or other objects of interest. The system 100 may also be used to identify any suitable parameter or parameters of interest related to the target(s) 102. Example parameters that may be detected by the system 100 include range (distance) and Doppler velocity (speed) of each target 102.

The system 100 here includes transmitter electronics 104 and a transmitter 106. The transmitter electronics 104 generally operate to generate one or more electrical signals, and the transmitter 106 generally operates to convert the electrical signal(s) into one or more optical signals for transmission. For example, the transmitter electronics 104 may include electrical components that generate at least one electrical signal having at least one desired waveform (including frequency-shifted pulses), and the transmitter 106 may generate at least one laser signal having the same waveform(s). The transmitter electronics 104 include any suitable structure for controlling operation of a transmitter. The transmitter 106 includes any suitable structure for generating at least one laser signal or other optical signal containing pulses.

The at least one optical signal from the transmitter 106 is provided via transmit/receive optics 108 to a telescope 110. The transmit/receive optics 108 function as a transmit/receive switch and allow both outgoing and incoming optical signals to pass through the telescope 110. The transmit/receive optics 108 include any suitable optical device or devices for facilitating both transmission and reception of optical signals through a telescope or other common structure.

The telescope 110 generally operates to direct at least one outgoing optical signal 112 towards one or more targets 102. The at least one optical signal 112 denotes the at least one optical signal generated by the transmitter 106 and includes a number of pulses, including frequency-shifted pulses, in a desired waveform. The transmission of the optical signal(s) 112 towards the target 102 results in reflected laser light 114 that can travel in various directions from the target 102. At least some of the reflected laser light 114 travels back to the telescope 110 as at least one reflected optical signal 116. The telescope 110 can therefore be used to direct laser pulses toward a target 102 of interest and to receive reflected laser pulses from the target 102. The telescope 110 may include focusing optics or other optical devices to facilitate the directing of pulses towards one or more targets 102 and the receipt of reflected pulses from the target(s) 102. The telescope 110 includes any suitable structure for directing and receiving optical signals.

The at least one reflected optical signal 116 received by the telescope 110 is directed through the transmit/receive optics 108 to a receiver that processes the at least one reflected optical signal 116. In this example, the at least one reflected optical signal 116 is directed to a detector array 118. The detector array 118 receives the at least one reflected optical signal 116 and generates at least one output, which is based on the at least one reflected optical signal 116. For example, the output of the detector array 118 may include pulses contained in the reflected optical signal(s) 116. Detector electronics 120 use the output of the detector array 118 to identify pulses in the optical signal(s) 116. The identified pulses are analyzed by a signal processor 122, which can use the pulses to detect the target 102 and one or more parameters of the target 102 (such as range and Doppler velocity).

The detector array 118 includes any suitable structure for receiving optical signals. The detector electronics 120 include any suitable structure for detecting optical signals, such as a Geiger Mode Avalanche Photo Diodes (GMAPD) detector array. The signal processor 122 includes any suitable structure for analyzing signals, such as a microprocessor, microcontroller, digital signal processor (DSP), field programmable gate array (FPGA), application specific integrated circuit (ASIC), or discrete logic devices. In some embodiments, the signal processor 122 may execute software instructions for detecting and analyzing pulses as described below.

The outputs of the signal processor 122 may be used in any suitable manner. In this example, the outputs of the signal processor 122 can be presented on a display device 124 (such as a monitor) or stored on a storage device 126 (such as a RAM, ROM, Flash memory, hard drive, or optical disc). Note, however, that the outputs of the signal processor 122 may be used in any other suitable manner and may be provided to any other suitable devices or systems.

As shown in FIG. 1B, a laser apparatus 101 is used to detect one or more targets 102 and one or more parameters associated with each of the targets 102. The laser apparatus 101 can include a housing 128 for containing one or more components of the laser system 100, including transmitter electronics 104, transmitter 106, transmit/receive optic 108, telescope 110, detector array 118, detector electronics 120, signal processor 122, display 124, and storage 126. In certain embodiments, the housing 128 can be a shell of a projectile, a skin of an airplane or helicopter, etc.

Although FIGS. 1A and 1B illustrate examples of a laser system 100 and a laser apparatus 101, various changes may be made to FIGS. 1A and 1B. For example, the system 100 in FIG. 1A is shown in simplified form to facilitate an easier understanding of this disclosure. Laser detection systems can include a number of other or additional components that perform a wide variety of functions.

Figure 2A:
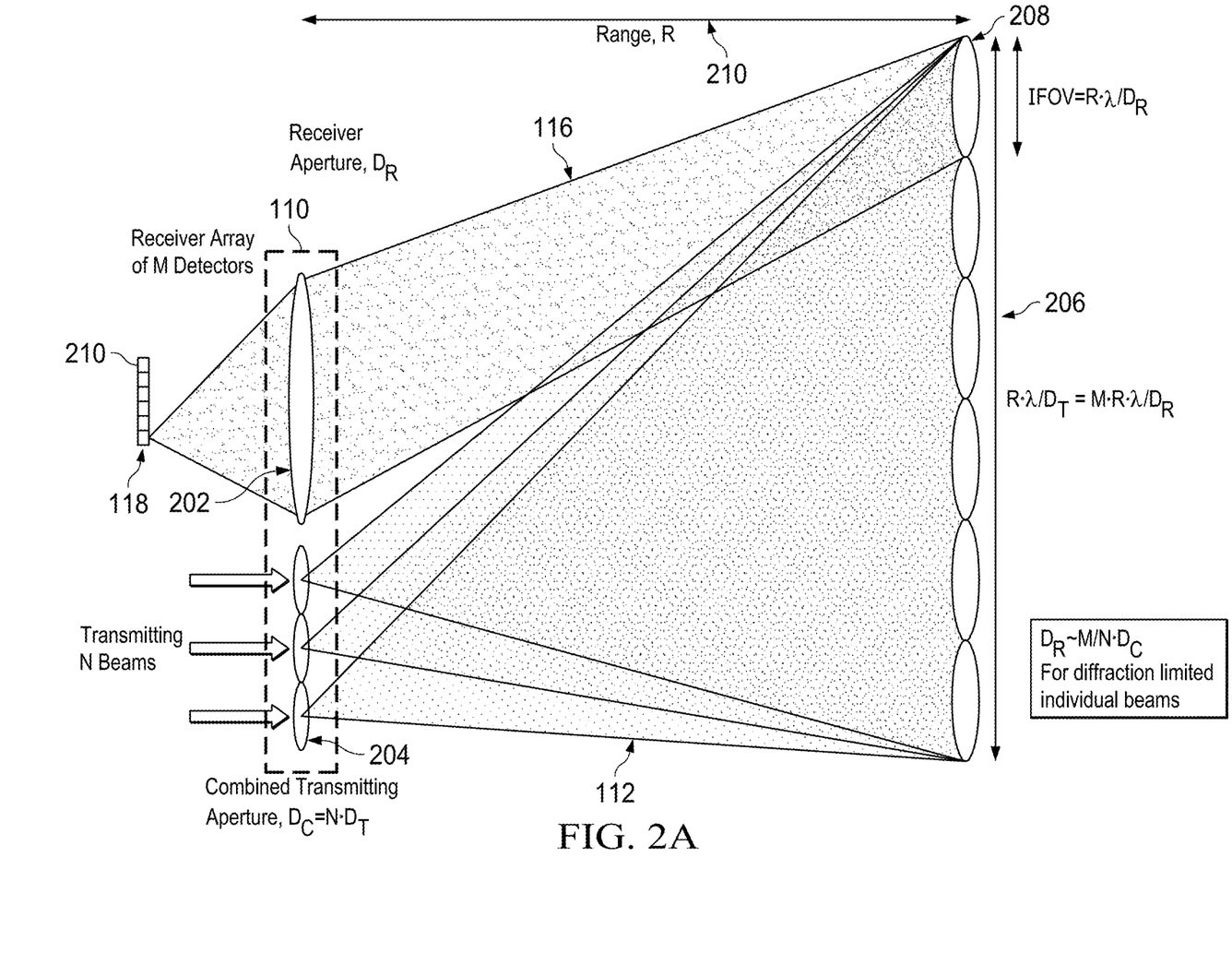
FIGS. 2A and 2B illustrate example uses of multiple transmitting beams to illuminate a field of view of a receiver array according to this disclosure.
Figure 2B:
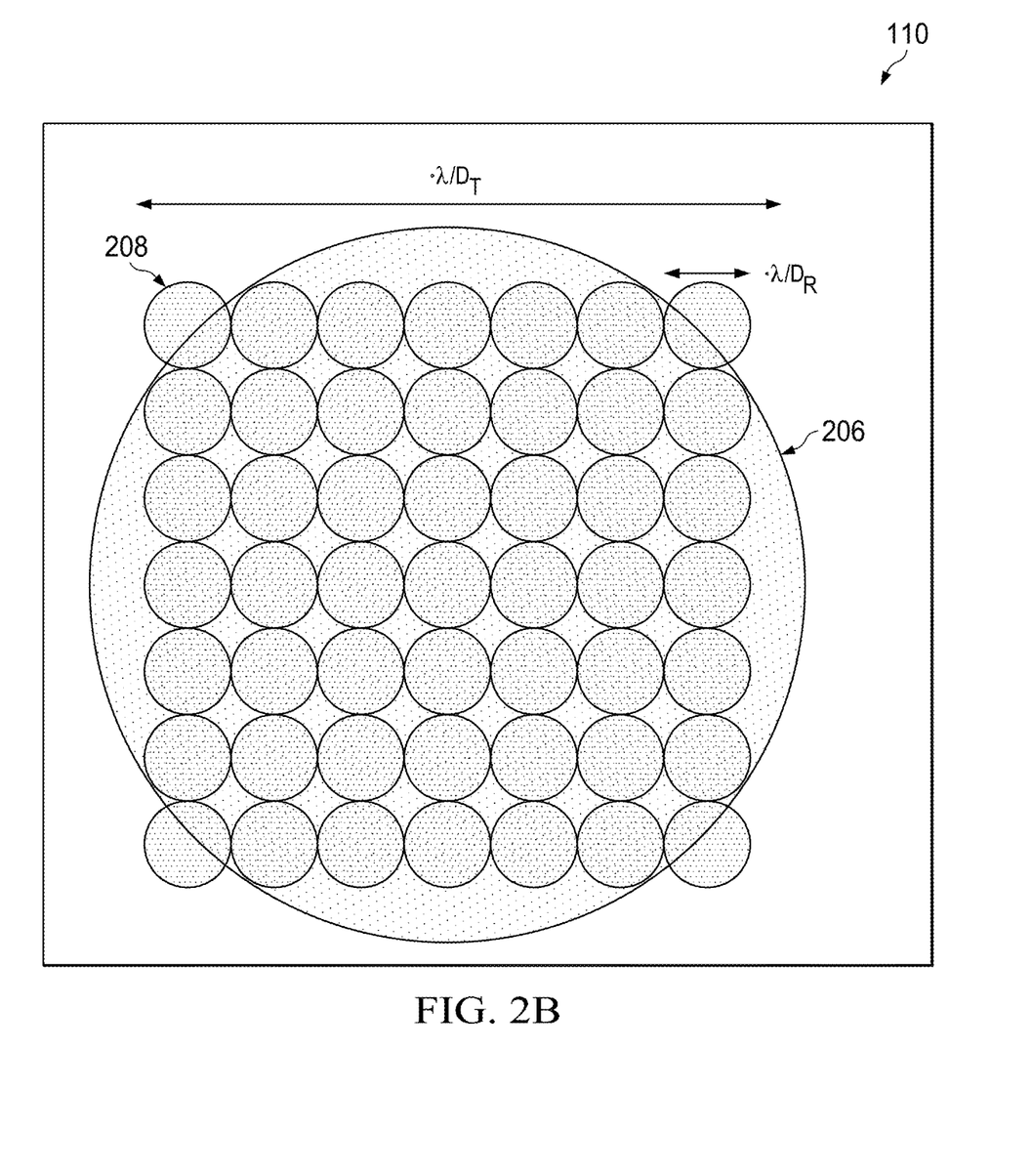

FIGS. 2A and 2B illustrate example uses of multiple transmitting beams to illuminate a field of view of a receiver array according to this disclosure. More specifically, FIGS. 2A and 2B illustrate example uses of multiple transmitted optical signals 112 to illuminate a field of view (FOV) of various detectors 200 in a detector array 118. In FIG. 2A, it is assumed that the laser system 100 includes a receiver aperture 202 and multiple transmitting apertures 204 around the receiver aperture 202. In FIG. 2B, it is assumed that the laser system 100 includes a receiver aperture 202 and multiple transmitting apertures 204 within the receiver aperture 202. Note that various components in FIGS. 2A and 2B may reside within or be used as part of the transmitter electronics 104, telescope 110, detector array 118, or other portions of the system 100.

As shown in FIG. 2A, the detector array 118 includes a plurality of detectors 200. While illustrated as a one-dimensional array of detectors 200 here for simplicity, the detector array 118 may have a multi-dimensional array of detectors 200. Each detector 200 can detect at least one reflected optical signal 116, which can be used by the detector electronics 120 and the signal processor 122 to determine one or more parameters of an object or a scene.

The telescope 110 can be generally divided into at least two sections, namely a receiver aperture 202 and multiple transmitting apertures 204. The receiver aperture 202 is aligned with the detector array 118 in order to receive at least one reflected optical signal 116 across an entire FOV 206. The receiver aperture 202 focuses a reflected optical signal from each instantaneous FOV 208 to a specific detector 200 in the detector array 118. Here, each instantaneous FOV 208 corresponds to one of the detectors 200, and the collection of instantaneous FOVs 208 forms the entire FOV 206. The receiver aperture 202 includes any suitable structure for focusing a laser signal or other optical signal containing pulses on a detector array 118.

As shown in FIG. 2B, each of the transmitting apertures 204 focuses a transmitted optical signal 112 across the entire FOV 206. A number of transmitting apertures 204 corresponds to a number of transmitted optical signals 112. The transmitting apertures 204 can be arranged in any suitable manner, such as in a group on a side of the receiver aperture 202 or on different sides or around the receiver aperture 202. Because the transmitting apertures 204 are used to spread transmitted optical signals 112 across the entire FOV 206, a size of each transmitting aperture 204 can be much smaller than the receiver aperture 202. Each transmitting aperture 204 is structured to have a transmitting aperture $D_T$. The cumulation of transmitting apertures 204 are structured or arranged to have a combine transmitting aperture Dc which is equal to a number N of transmitting apertures 204 in one dimension multiplied by the single transmitting aperture $D_T$. Each transmitting aperture 202 includes any suitable structure for spreading a laser signal or other optical signal towards a target 102. In some cases, the transmitting apertures 204 can be located in an array outside of the receiving aperture 202, where a size of the receiving aperture 202 is reduced to accommodate the transmitting apertures 204. When a diameter of the receiver aperture 202 is reduced by ⅓, the area is reduced by ⅑ or 10%. This reduction is ideal for maintaining functionality of the LADAR system 100. For optimal efficiency of the telescope 110, the diameter of the receiver aperture 202 should be greater than twice the cumulative or effective diameter of the transmitting apparatus 204. Where the cumulative or effective diameter of the transmitting aperture 204 corresponds to a distance based on a reduction of a maximum diameter of the receiving aperture 202 inside the telescope 110.

Small areas of the receiver aperture 202 can be used for the transmitting apertures 204, resulting in a single lens or a receiver aperture 202 with portions removed to fit the transmitting apertures 204. An amount of observation for an amount of the receiver aperture 202 removed may be negligible based on a size of the transmitting apertures 204.

As noted above, each of the detectors 200 corresponds to a small portion of the entire FOV 206, where that portion is referred to an instantaneous FOV 208. The instantaneous FOV 208 can be determined by multiplying a range 210 by λ, divided by a receiver diopter $D_R$ of the receiver aperture 202, where λ, is a wavelength of light. Multiple instantaneous FOVs 208 define the total area of the FOV 206. Also as noted above, each of the transmitting apertures 204 can be designed to spread each transmitted optical signal 112 across the entire FOV 206. A transmitting aperture $D_T$ can be determined based on the following:

$$R \cdot \lambda / D_T = M \cdot R \lambda / D_R \quad (1)$$

where the right side of Equation (1) defines an illumination area for the transmitted optical signals 112, R represents a range 210 of the target 102 from the system 100, and M represents a number of detectors 200 in one dimension of an array.

The usable range 210 depends on a power of the laser(s) used for the transmitted optical signals 112. Generating more power for the laser(s) can increase the range 210 of the system 100. In some cases, at least one fiber laser may be used as a laser generator, although other types of lasers may be used here.

As an example, an array of transmitting apertures 204 is positioned within the receiver aperture 202. Assuming a diffraction limit and an array of M×M detectors 200 in the detector array 118, a ratio of $D_R$ over $D_T$ is approximately equal to M. This would make a size of the transmitting aperture 204 approximately equal to $D_R$ divided by the number N of transmitted optical signals 112 in one direction of the array.

When the transmitter 106 is N×diffraction limited based on using an N×N array of transmitting apertures 204, in order to maintain the illumination FOV, a size of the combined transmitting apertures 204 may be approximately equal to a size of the receiver aperture 202 multiplied by N/M. When the transmitter 106 is efficiency factor (β) diffraction limited, the combined transmitting aperture 204 may be approximately equal to a size of the receiver aperture 202 multiplied by β (N/M). As a non-limiting example, the efficiency factor can be in a range of 1.1 to 1.5, and the ratio of N/M with the efficiency factor may be approximately 3.

Although FIGS. 2A and 2B illustrate example uses of multiple transmitted optical signals 112 to illuminate a FOV of a detector array 118, various changes may be made to FIGS. 2A and 2B. For example, the telescope 110 shown in FIGS. 2A and 2B is for illustration only. Also, various components in FIGS. 2A and 2B may be combined, further subdivided, rearranged, or omitted and additional components may be added according to particular needs.

Figure 3A:
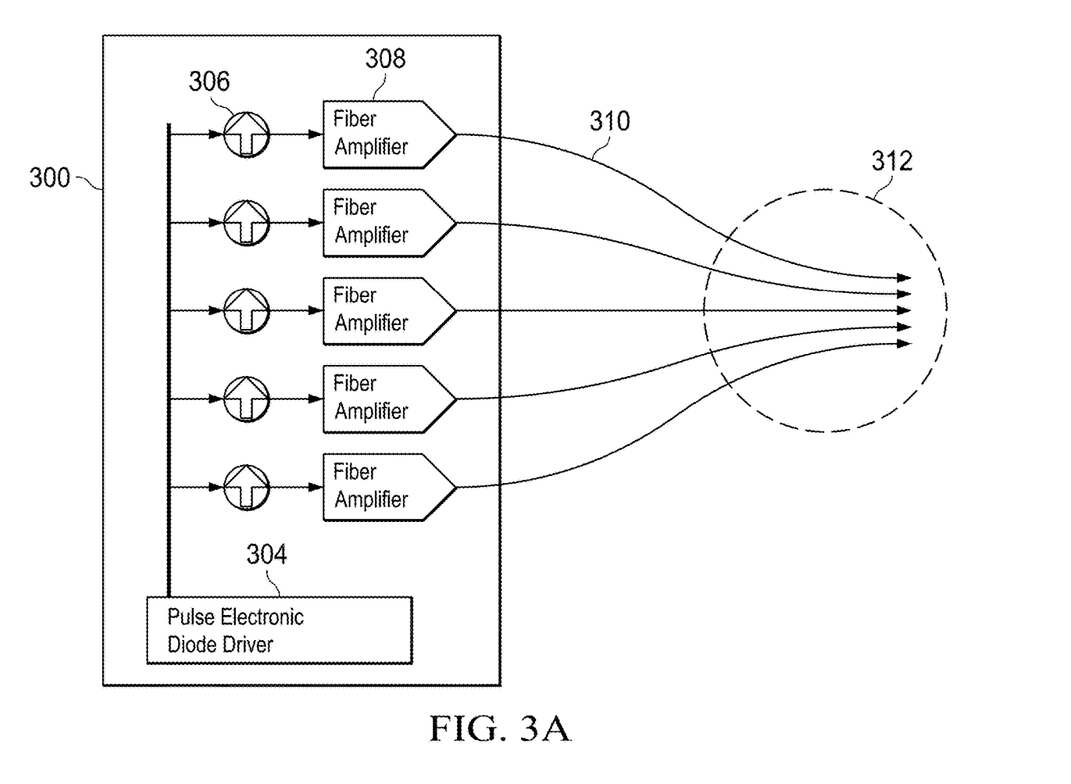
FIGS. 3A and 3B illustrate example laser sources for a transmitter according to this disclosure.
Figure 3B:
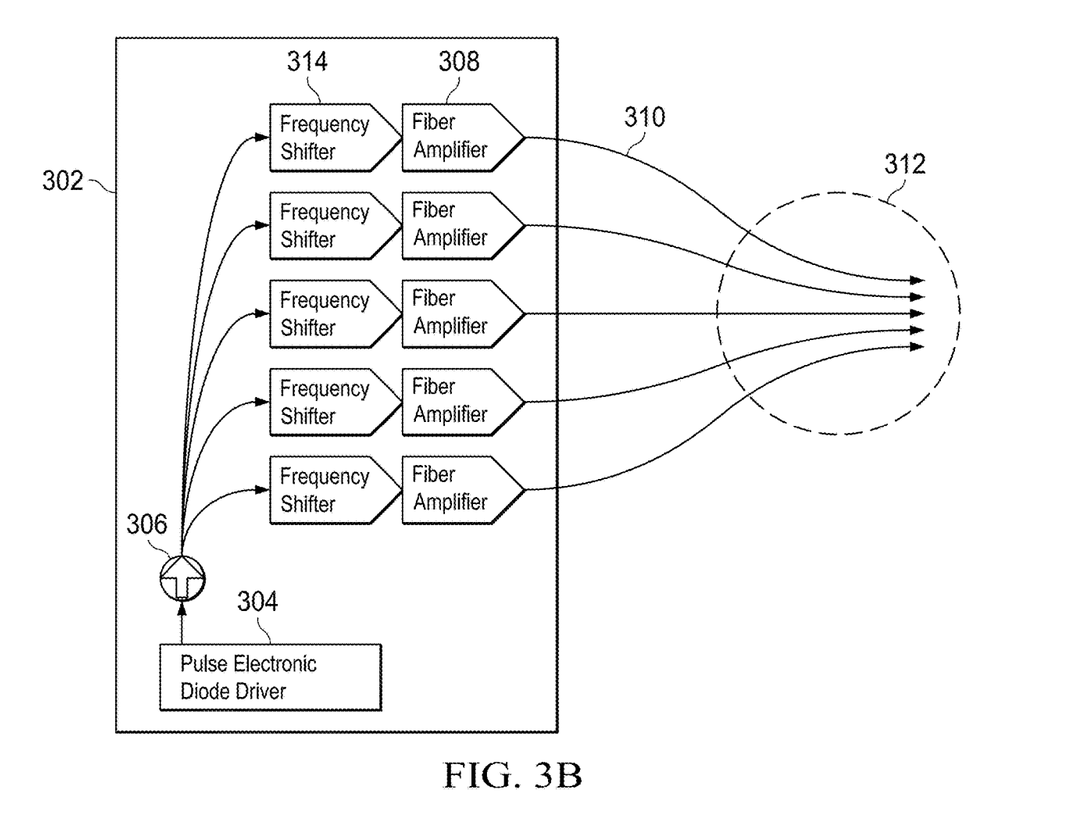

FIGS. 3A and 3B illustrate example laser sources for a transmitter according to this disclosure. In particular, FIG. 3A illustrates an example transmitter 300 with an independent laser source for each fiber amplifier, and FIG. 3B illustrates an example transmitter 302 with a single laser source split among a plurality of fiber amplifiers. For ease of explanation, the transmitters 300 and 302 in FIGS. 3A and 3B are described as being used in the system 100 of FIG. 1. However, the transmitter 300 and 302 may be supported by any other suitable system.

As shown in FIG. 3A, a multi-source transmitter 300 can include pulse driver electronics 304, multiple optical signal sources 306, and multiple fiber amplifiers 308. The multi-source transmitter 300 generates and transmits optical signals 112 through a fiber bundle 312. The multi-source transmitter 300 includes any suitable structure for generating and transmitting optical signals 112 through a fiber bundle 312. In some embodiments, the multi-source transmitter 300 can be implemented as at least part of the transmitter electronics 104 shown in FIG. 1.

The pulse driver electronics 304 control the operation of the optical signal sources 306 to thereby control the generation of the transmitted optical signals 112. For instance, the pulse driver electronics 304 may control when the optical signal sources 306 are operating and how optical pulses are generated by the optical signal sources 306. The optical signal sources 306 include any suitable structure(s) for modulating or generating optical signals. The pulse driver electronics 304 include any suitable structure for controlling electro-optical modulation or other generation of optical signals and for controlling pulses in optical signals.

The optical signal sources 306 are coupled to fibers 310 in the fiber bundle 312. The optical signal sources 306 are controlled by the pulse driver electronics 304 to generate optical pulses for each fiber 310. The optical signal sources 306 can also be controlled by the pulse driver electronics 304 to generate a suitable frequency offset for each of the optical pulses. In this example, the optical signal sources 306 output the generated optical pulses to a fiber amplifier 308, which can amplify the optical pulses for transmission towards at least one target 102 as the transmitted optical signals 112. The fiber amplifier 308 includes any suitable structure for amplifying optical signals, such as one or more laser pump diodes or other optical pump that provides optical energy used for amplification.

The fibers 310 in this example are coupled to an output of the fiber amplifier 308. The fibers 310 collectively are referred to as the fiber bundle 312. Each fiber 310 includes any suitable structure for transmitting optical signals.

As shown in FIG. 3B, the single-source transmitter 302 can include pulse driver electronics 304, an optical signal source 306, multiple fiber amplifiers 308, and multiple frequency shifters 314. The single-source transmitter 302 includes an optical signal source 306 that generates and transmits optical signals 112 through a fiber bundle 312. The single-source transmitter 302 includes any suitable structure for generating and transmitting optical signals 112 through a fiber bundle 312. In some embodiments, the single-source transmitter 302 can be implemented as at least part of the transmitter electronics 104 shown in FIG. 1.

A frequency shifter 314 can be implemented for each fiber 310 to receive the output from the optical signal source 306 and shift a frequency of the output. Each frequency shifter 314 may include frequency driver electronics to control the operation of the frequency shifter 314 to thereby control the frequency shift. For instance, frequency driver electronics may control when the frequency shifter 314 is operating and how the frequency shifter 314 shifts the output of the optical signal source 306. Each frequency shifter 314 includes any suitable structure for shifting the frequency of optical signals. The frequency driver electronics can include any suitable structure for controlling frequency shifting of optical signals. The output for each of the frequency shifters 314 is fed into a respective fiber amplifier 308.

Although FIGS. 3A and 3B illustrate examples of laser sources for a transmitter 302, various changes may be made to FIGS. 3A and 3B. For example, any suitable number of optical signal sources 306 may be used with any suitable number of fibers 310.

Figure 4A:
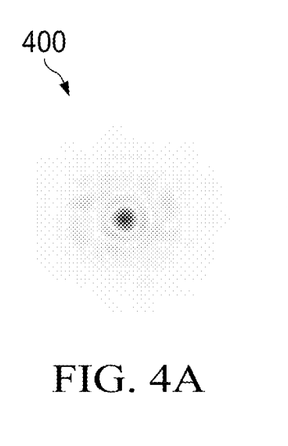
FIGS. 4A through 4E illustrate example illumination spots at different phase errors according to this disclosure.
Figure 4B:
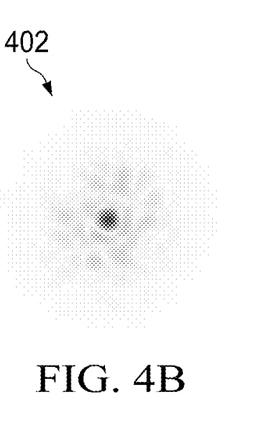
Figure 4C:
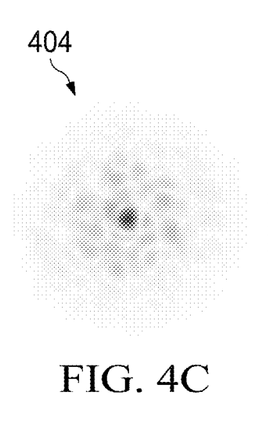
Figure 4D:
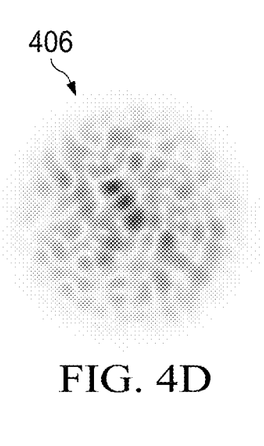
Figure 4E:
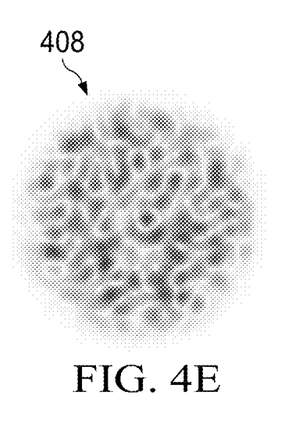
Figure 5A:
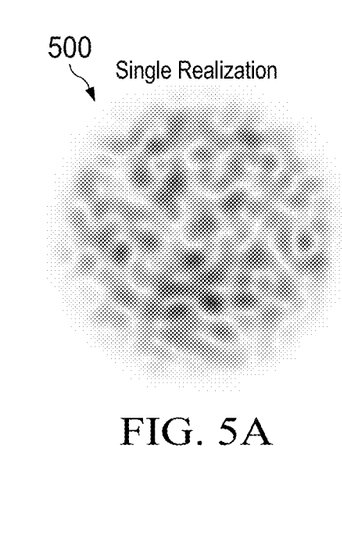
FIGS. 5A and 5B illustrate example illumination spots based on offsetting an optical frequency of each channel according to this disclosure.
Figure 5B:
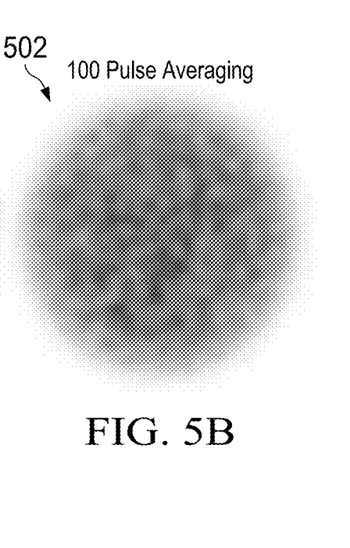

FIGS. 4A through 4E illustrate example illumination spots at different phase errors according to this disclosure, and FIGS. 5A and 5B illustrate example illumination spots based on offsetting an optical frequency of each channel according to this disclosure. In particular, FIG. 4A illustrates an illumination spot 400 at a $\pi/10$ phase error. when the fibers would be phase locked, FIG. 4B illustrates an illumination spot 402 at a $\pi/5$ phase error, FIG. 4C illustrates an illumination spot 404 at a $\pi/3$ phase error, FIG. 4D illustrates an illumination spot 406 at a $2\pi/3$ phase error, and FIG. 4E illustrates an illumination spot 408 at when the fibers are incoherently combined at the same frequency but at a completely random phase (i.e. maximum phase error). Also, FIG. 5A illustrates a single realization illumination spot 500, and FIG. 5B illustrates a 100-pulse average illumination spot 502. For ease of explanation, the results shown in FIGS. 4A through 5B are described as being obtained by the system 100 of FIG. 1. However, the system or other laser system designed in accordance with the teachings of this disclosure may obtain any other suitable results depending on the implementation.

As shown in FIGS. 4A through 4E, the illumination spots 400-408 are generated based on phase errors. If a laser source array is coherently combined, an illumination spot will be $\lambda/D_T$, where $D_T$ is the transmission aperture. The illumination spot 400 is based on a fiber bundle with the individual fibers fully coherently combined. If the laser source array is incoherently combined, the illumination spot will be $N\times\lambda/D_T$, where N is the number of lasers in one dimension (such as in an N×N array of lasers). The illumination spot 408 is based on a fiber bundle that is incoherently combined. There is also the possibility that the lasers are somewhat coherently combined, where there is some phase error in the combination that would make an illumination spot be somewhere between the two extremes of illumination spot 400 and illumination spot 408. In other functions of fiber bundles, the fully coherent illumination spot is ideal.

For LIDAR, the incoherently bundled fibers provide unexpected results benefitting the identifying one or more parameters of a target.

As shown in FIGS. 5A and 5B, a single realization illumination spot 500 is generated from a single received pulse. The pulse averaging illumination spot 502 is generated from multiple pulses received, and the detected patterns are averaged to reduce speckle. By offsetting the optical frequency of each channel by at least the pulse repetition frequency of the laser pulses, a new independent speckle pattern can be created at each frame, which smooths out the effects of the speckle.

Although FIGS. 4A through 4E illustrate examples of illumination spots at different phase errors and FIGS. 5A and 5B illustrate examples of illumination spots based on offsetting an optical frequency of each channel, various changes may be made to FIGS. 4A through 5B. For example, the information contained in the various plots of FIGS. 4A through 5B are for illustration only and are merely meant to illustrate the types of results that may be obtained by the system 100 using different waveforms.

Figure 6:
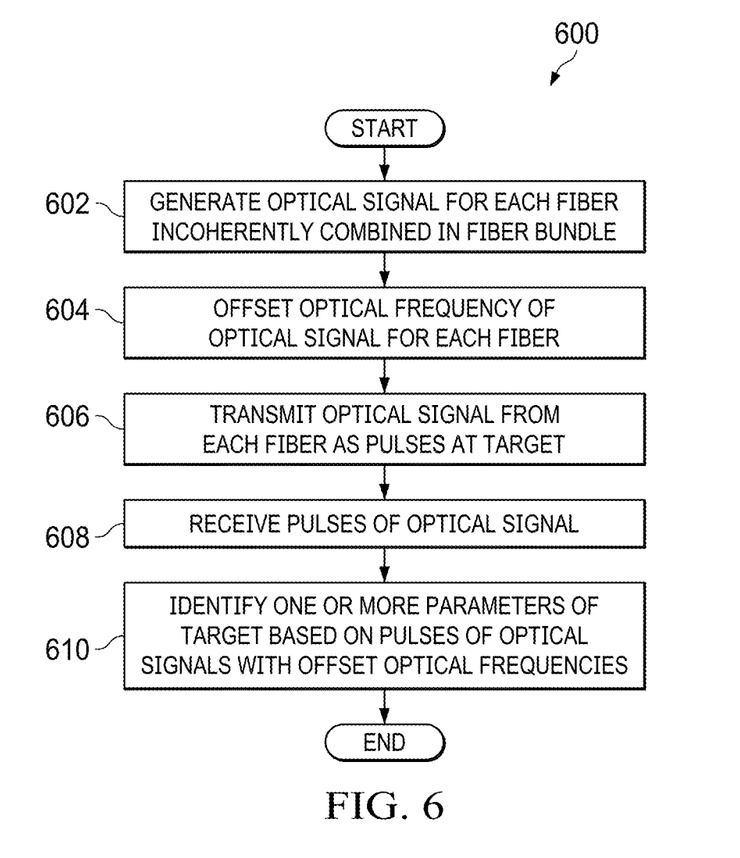
FIG. 6 illustrates an example method for operating a laser system with a fiber-bundled frequency-shifted transmitter according to this disclosure.

FIG. 6 illustrates an example method 600 for operating a laser system according to this disclosure. For ease of explanation, the method 600 of FIG. 6 is described as being performed using the laser system 100 of FIG. 1 with the transmitter 106 of FIG. 3A or 3B. However, the method 600 may be used with any other suitable system and any other suitable transmitter.

As shown in FIG. 6, an optical signal 112 for each fiber 310 incoherently combined in a fiber bundle 312 is generated at step 602. This may include, for example, the transmitter 106 using multiple optical sources 306 to generate multiple optical signals 112, where the optical signal 112 for each fiber 310 is generated by an optical source 306 specifically designated for the fiber 310. Alternatively, this may include the transmitter 106 using an optical source 306 to generate multiple optical signals 112 for multiple fibers 310. The fibers are combined in an incoherent way or in a manner that their optical phases are not altered or otherwise actively controlled.

Pulses of the optical signals 112 are frequency shifted at step 604. This may include, for example, the transmitter 106 of the system 100 using pulse driver electronics 304 to control multiple optical sources 306 in order to cause the pulses from the optical sources 306 to be frequency offset. Alternatively, this may include the transmitter 106 of the system 100 using a single laser source 306 controlled by the pulse driver electronics 304 and using a frequency shifter 314 in each fiber 310 to shift the frequencies of the optical signals 112.

Each optical signal 112 is transmitted from the associated fiber 310 as pulses at a target 102 at step 606, and a reflection of each optical signal 112 is received at a detector array 118 at step 608. In some cases, the detector array 118 may be formed using detectors 200 in a one-dimensional or multi-dimensional array. Each detector 200 may be designed and arranged for use with the receiver aperture 202 to detect a reflected optical signal 116 for an instantaneous FOV 208. Combining the instantaneous FOVs 208 for the detectors 200 defines an entire FOV 206 for the receiver of the laser system. Each of the fibers 310 may be designed and arranged with a transmitting aperture 204 to transmit the pulses of the associated optical signal 112 across the entire FOV 206.

One or more parameters of the target 102 are identified based on the pulses of the reflected optical signals 116 with offset optical frequencies at step 610. This may include, for example, the signal processor 122 of the system 100 using the results to identify a range to the target 102 and a range rate of the target 102. Other information related to the target 102 may also or alternatively be generated based on the processing of the pulses in the reflected optical signal 116. The one or more parameters of the target can be output or used at step 610. This may include, for example, the signal processor 122 of the system 100 outputting the parameter(s) of the target 102 to a display 124 for presentation or to a storage device 126 for temporary or long-term storage. The parameters of the target 102 may also or alternatively be used in any other suitable manner.

Although FIG. 6 illustrates one example of a method 600 for operating a laser system, various changes may be made to FIG. 6. For example, while shown as a series of steps, various steps in FIG. 6 may overlap, occur in parallel, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
generating, using a transmitter, optical signals for a plurality of fibers incoherently combined in a fiber bundle;
transmitting the optical signals from the fibers as pulses at a target;
receiving, using a receiver array, the pulses of the optical signals; and
identifying one or more parameters of the target based on the pulses of the optical signals;
wherein each of the fibers is supported by an independent laser source; and
wherein a pulse driver controls offsetting an optical frequency at each independent laser source.

2. The method of claim 1, further comprising:
offsetting the optical frequencies of the optical signals;
wherein the one or more parameters of the target are identified using the optical signals with the offset optical frequencies.

3. The method of claim 2, wherein the optical frequencies are offset by a pulse repetition frequency of the pulses.

4. The method of claim 1, wherein:
the receiver array includes a multi-dimensional array of detectors;
each detector is configured to detect a reflected optical signal within an instantaneous field of view;
an accumulation of each instantaneous field of view defines an entire field of view; and
the optical signal from each of the fibers is directed across the entire field of view.

5. The method of claim 1, wherein:
the optical signals are transmitted through transmitting apertures that are different for different fibers;
the optical signal for each of the fibers is received through a single receiver aperture; and
a diameter of the receiver aperture is more than twice a combined diameter of the transmitting apertures.

6. A method comprising:
generating, using a transmitter, optical signals for a plurality of fibers incoherently combined in a fiber bundle;
transmitting the optical signals from the fibers as pulses at a target receiving, using a receiver array, the pulses of the optical signals; and
identifying one or more parameters of the target based on the pulses of the optical signals;
wherein the fiber bundle is supported by a laser source; and
wherein each of the fibers includes a frequency shifter configured to shift an optical frequency of the optical signal in that fiber.

7. The method of claim 6, further comprising:
offsetting the optical frequencies of the optical signals;
wherein the one or more parameters of the target are identified using the optical signals with the offset optical frequencies.

8. The method of claim 7, wherein the optical frequencies are offset by a pulse repetition frequency of the pulses.

9. The method of claim 6, wherein:
the receiver array includes a multi-dimensional array of detectors;
each detector is configured to detect a reflected optical signal within an instantaneous field of view;
an accumulation of each instantaneous field of view defines an entire field of view; and
the optical signal from each of the fibers is directed across the entire field of view.

10. The method of claim 6, wherein:
the optical signals are transmitted through transmitting apertures that are different for different fibers;
the optical signal for each of the fibers is received through a single receiver aperture; and
a diameter of the receiver aperture is more than twice a combined diameter of the transmitting apertures.

11. A system comprising:
a transmitter configured to (i) generate optical signals for a plurality of fibers incoherently combined in a fiber bundle and (ii) transmit the optical signals from the fibers as pulses at a target;
a receiver array configured to receive the pulses of the optical signals; and
a signal processor configured to identify one or more parameters of the target based on the pulses of the optical signals;
wherein each of the fibers is supported by an independent laser source; and
wherein the transmitter comprises a pulse driver configured to control offsetting of an optical frequency at each independent laser source.

12. The system of claim 11, wherein
the signal processor is configured to identify the one or more parameters of the target using the optical signals with the offset optical frequencies.

13. The system of claim 12, wherein the transmitter is configured to offset the optical frequencies by a pulse repetition frequency of the incoherent pulses.

14. The system of claim 11, wherein:
the transmitter is configured to transmit the optical signals through transmitting apertures that are different for different fibers;
the receiver array is configured to receive the optical signal for each of the fibers through a single receiver aperture; and
a diameter of the receiver aperture is more than twice a combined diameter of the transmitting apertures.

15. The system of claim 11, wherein:
the receiver array includes a multi-dimensional array of detectors;
each detector is configured to detect a reflected optical signal within an instantaneous field of view;
an accumulation of each instantaneous field of view defines an entire field of view; and
the transmitter is configured to direct the optical signal from each of the fibers across the entire field of view.

16. A system comprising:
a transmitter configured to (i) generate optical signals for a plurality of fibers incoherently combined in a fiber bundle and (ii) transmit the optical signals from the fibers as pulses at a target;
a receiver array configured to receive the pulses of the optical signals; and
a signal processor configured to identify one or more parameters of the target based on the pulses of the optical signals;
wherein the fiber bundle is supported by a laser source; and
wherein each of the fibers includes a frequency shifter configured to shift an optical frequency of the optical signal in that fiber.

17. The system of claim 16, wherein
the signal processor is configured to identify the one or more parameters of the target using the optical signals with the shifted optical frequencies.

18. The system of claim 17, wherein the transmitter is configured to offset the optical frequencies by a pulse repetition frequency of the pulses.

19. The system of claim 16, wherein:
the receiver array includes a multi-dimensional array of detectors;
each detector is configured to detect a reflected optical signal within an instantaneous field of view;
an accumulation of each instantaneous field of view defines an entire field of view; and
the transmitter is configured to direct the optical signal from each of the fibers across the entire field of view.

20. The system of claim 16, wherein:
the transmitter is configured to transmit the optical signals through transmitting apertures that are different for different fibers;
the receiver array is configured to receive the optical signal for each of the fibers through a single receiver aperture; and
a diameter of the receiver aperture is more than twice a combined diameter of the transmitting apertures.

21. A system comprising:
a transmitter configured to (i) generate optical signals for a plurality of fibers incoherently combined in a fiber bundle and (ii) transmit the optical signals from the fibers as incoherent pulses at a target;
a receiver array configured to receive the incoherent pulses of the optical signals; and
a signal processor configured to identify one or more parameters of the target based on the incoherent pulses of the optical signals;
wherein the receiver array includes a multi-dimensional array of detectors;
wherein each detector is configured to detect a reflected optical signal within an instantaneous field of view;
wherein an accumulation of each instantaneous field of view defines an entire field of view; and
wherein the transmitter is configured to direct the optical signal from each of the fibers across the entire field of view.

* * * * *